No. 733,311. PATENTED JULY 7, 1903.
C. W. BROCK.
FORMED CUTTER.
APPLICATION FILED MAR. 12, 1900.
NO MODEL. 2 SHEETS—SHEET 1.
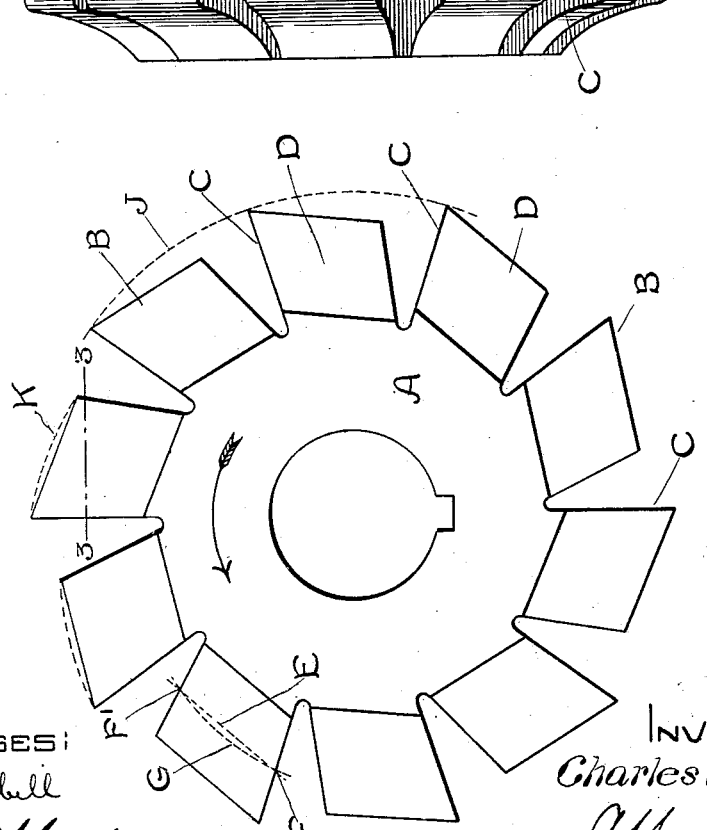
WITNESSES:
Rollin Abell
Alex F. Macdonald
INVENTOR:
Charles W. Brock
by Albert H. Davis
Atty.

No. 733,311. PATENTED JULY 7, 1903.
C. W. BROCK.
FORMED CUTTER.
APPLICATION FILED MAR. 12, 1900.
NO MODEL. 2 SHEETS—SHEET 2.

Witnesses: Inventor.
Charles W. Brock.
by Albert G. Davis.
Atty.

No. 733,311. Patented July 7, 1903.

UNITED STATES PATENT OFFICE.

CHARLES W. BROCK, OF LYNN, MASSACHUSETTS, ASSIGNOR TO GENERAL ELECTRIC COMPANY, A CORPORATION OF NEW YORK.

FORMED CUTTER.

SPECIFICATION forming part of Letters Patent No. 733,311, dated July 7, 1903.

Application filed March 12, 1900. Serial No. 8,363. (No model.)

*To all whom it may concern:*

Be it known that I, CHARLES W. BROCK, a citizen of the United States, residing at Lynn, county of Essex, State of Massachusetts, have invented certain new and useful Improvements in Formed Cutters, of which the following is a specification.

My invention relates to formed cutters used in connection with gear-cutting machinery, milling-machines, &c., and has for its object an improvement in the shape of the cutter and of the cutting-teeth.

Cutters of ordinary construction—such, for example, as those of the ordinary manufacture—are provided with curved clearance for the teeth—that is to say, the sides or flanks of the teeth are curved circumferentially—the amount of the curvature depending principally on the diameter of the cutter. Cutters designed in this way are not entirely satisfactory—first, because the chips from the cutting edge are liable to be wedged between the flanks of the teeth and the stock in which the cut is being made, and, second, because the tooth alters its shape slightly as it is sharpened from time to time. With cutters of this class, and particularly those designed for cutting small gears, there is usually a point in the tooth which is the exact size desired; but back from that point the size of the tooth is slightly decreased to give clearance. The first-mentioned objection can be plainly determined by examining a cutter after it has been in use for some time. The cutting or front face of the tooth may be in good shape; but a short distance back of this face and on the side flanks small worn or polished spots will appear, showing that the chips bound the cutting-tooth at that point.

To overcome the above objections, I make the sides of the teeth straight instead of curving them circumferentially, so that no matter how much the tooth is cut back in grinding, providing it is properly done, the shape always remains the same, and by giving each tooth as a whole a slight inclination backward ample clearance is provided for the chips at the point of the tooth.

Figure 4:
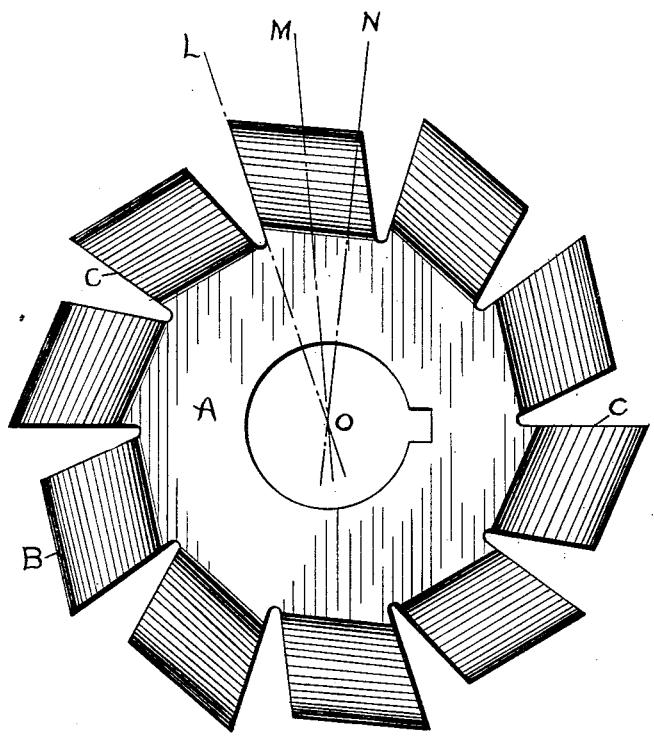
Figure 5:
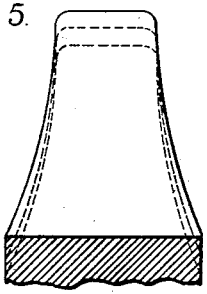

In the accompanying drawings, which illustrate one form of my invention, Figure 1 is a side elevation of a gear-cutter. Fig. 2 is an end elevation thereof. Fig. 3 is an enlarged sectional view taken on line 3 3 of Fig. 1. Fig. 4 is a side elevation of the cutter; and Fig. 5 is a face view of the tooth, showing sections in dotted lines.

The main body or hub A of the cutter is provided with a number of radially-extending teeth B and is designed to be keyed or otherwise secured to a driving-shaft.

The cutting-faces C of the teeth are radial with respect to the center of the cutter and may be of any suitable shape. In the present instance they are shown as being designed to cut gear-teeth; but they may be shaped so as to perform any other desired class of work. The sides or flanks D of the teeth are straight—that is to say, a straight line, including two corresponding points in a tooth, one point being located on the cutting-face, the other on the rear face, would also include every other corresponding point in the tooth. For example, E is a straight line, which includes point F on the cutting-face C, point F' on the rear face, and also every other corresponding point in the tooth. Assuming now that the ordinary cutter is under discussion, a line to include all of the corresponding points in the tooth would have to be curved as shown by line G. In other words, each side of each tooth is curved from its base to its top, and these curved sides are composed of straight lines which cross such curvature and join corresponding points in the edges of the front and rear faces.

Referring to the enlarged cross-section, Fig. 3, the difference between a cutter having curved and straight clearance is very noticeable. C represents the cutting-face, H the rear face, and D the flanks, of a tooth. Owing to the section being taken at an angle, the rear face is shown as being narrower than the front face; but had the section been made on line E both ends would have been alike. The full lines connecting the front and rear faces represent the straight clearance of my invention, while the dotted curved lines I represent the curved clearance of the ordinary cutter. It will readily be seen that much more clearance is provided with the straight than with the curved tooth construction.

The straight lines of the sides of the teeth in the direction of cutting are clearly shown in Fig. 4, and it will be noted that these lines are all parallel with respect to each other and tangent to circles concentric with the cutter itself. Hitherto these lines transverse to the curvature have been arcs of circles not concentric with the cutter.

Fig. 5 shows three face views of the teeth of the cutter shown in Fig. 4, the full lines representing an elevation at the line O L of Fig. 4 and the dotted lines representing face views on sections shown at the lines O M and O N. The sides of the teeth are composed of straight lines; but as the teeth have a backward inclination from the center of the cutter the face views taken at the lines O M and O N are shown below and behind the elevation view. It will be noted that the tooth is always the same shape no matter how much it may have been ground back in repairing the cutting edge, the only difference being in the diameter of the cutter as a whole.

In order to provide clearance for the point of the cutter, the outer surface of each tooth is cut back from the circle J, which connects the points. I make the tooth straight at this point also, instead of rounding it in the usual manner, as indicated by the dotted line K. The amount that the teeth are cut back from one end to the other may be varied, as desired. With the construction described an easier and freer cutting edge is provided, and there is less liability of the chips rolling under the cutting-teeth, and thereby wedging to a certain extent the cutter in the stock. There is also less to remove from the face of the teeth when sharpening to bring to a proper cutting edge.

In forming the teeth of the present cutter a series of straight cuts are made, the several cuts being parallel. It will readily be seen that the base line of the root of each tooth forms a tangent to a given circle. With prior constructions with which I am familiar the teeth are formed by a series of cuts more or less curved, the curve being eccentric to the center of revolution of the cut.

The cutter is particularly useful in cutting pinions and small gears where the flanks of the teeth extend for a portion of their length in planes making a right angle or a substantial right angle with the axis of the cutter. When the cutters are designed for larger gears and racks, the flanks occupy planes more or less inclined to the axis, and the advantage of straight clearance is not so pronounced, although it still exists.

From the advantages above described it follows that the cutter can be made to do more work in a given time, and this without increasing the power necessary to drive it. The teeth are in no way altered in shape when properly ground, and the clearance always remains the same.

What I claim as new, and desire to secure by Letters Patent of the United States, is—

1. A rotary cutter, comprising a plurality of radially-disposed teeth, each tooth having a cutting-face suitable for cutting gears, and a body that has the same cross-section at all points measured in planes parallel to the cutting-face, with a straight top and root which are parallel to each other whereby a straight clearance is provided.

2. A rotary cutter comprising a plurality of radially-disposed teeth, each tooth having a cutting-face of suitable shape that extends parallel to the axis of rotation, the body of each tooth having the same cross-section at all points in planes parallel with the face, and a straight top and root which are tangential to given concentric circles, whereby a straight clearance on each side of the tooth is provided.

In witness whereof I have hereunto set my hand this 6th day of March, 1900.

CHARLES W. BROCK.

Witnesses:
DUGALD McKILLOP,
JOHN McMANUS.